United States Patent
Bakran et al.

(10) Patent No.: US 10,714,939 B2
(45) Date of Patent: Jul. 14, 2020

(54) LONGITUDINAL VOLTAGE SOURCE AND DIRECT CURRENT TRANSMISSION SYSTEM WITH A LONGITUDINAL VOLTAGE SOURCE

(71) Applicant: SIEMENS AKTIENGESELLSCHAFT, Munich (DE)

(72) Inventors: Mark-Matthias Bakran, Erlangen (DE); Viktor Hofmann, Bayreuth (DE)

(73) Assignee: Siemens Aktiengesellschaft, Munich (DE)

( * ) Notice: Subject to any disclaimer, the term of this patent is extended or adjusted under 35 U.S.C. 154(b) by 216 days.

(21) Appl. No.: 16/060,534

(22) PCT Filed: Dec. 21, 2015

(86) PCT No.: PCT/EP2015/080763
§ 371 (c)(1),
(2) Date: Jun. 8, 2018

(87) PCT Pub. No.: WO2017/108073
PCT Pub. Date: Jun. 29, 2017

(65) Prior Publication Data
US 2018/0358809 A1 Dec. 13, 2018

(51) Int. Cl.
*H02J 1/06* (2006.01)
*H02J 3/36* (2006.01)
*H02J 1/14* (2006.01)

(52) U.S. Cl.
CPC .................... *H02J 3/36* (2013.01);
*H02J 1/06* (2013.01); *H02J 1/14* (2013.01);
*Y02E 60/60* (2013.01)

(58) Field of Classification Search
CPC ...................................... H02J 1/00; H02J 1/06
(Continued)

(56) References Cited

U.S. PATENT DOCUMENTS

2011/0255316 A1* 10/2011 Burger .................... H02J 3/32
363/98
2016/0072396 A1* 3/2016 Deboy .............. H02M 3/33592
363/21.1

OTHER PUBLICATIONS

Balasubramaniam, S., et al; "Control, dynamics and operation of a dual H-bridge current flow controller"; IEEE Energy Conversion Congress and Expostition; IEEE, Sep. 20, 2015.
(Continued)

*Primary Examiner* — Adi Amrany
(74) *Attorney, Agent, or Firm* — Laurence Greenberg; Werner Stemer; Ralph Locher

(57) ABSTRACT

A longitudinal voltage source interconnects into a first line and a second line and feeds a longitudinal voltage into each of the two lines. The voltage source has first and second H-bridge circuits, each with four switches, and with outer terminals and center terminals. The center terminals are connectable to disconnected locations of the first and second lines. A capacitor has a first capacitor terminal connected to the two first output terminals of the two H-bridge circuits and a second capacitor terminal connected to the two second output terminals of the two H-bridge circuits. One or more switching modules are connected between the first capacitor terminal and the first output terminals of the first and second H-bridge circuits, and one or more switching modules are connected between the second capacitor terminal and the second output terminals of the first and second H-bridge circuits.

16 Claims, 7 Drawing Sheets

(58) Field of Classification Search
USPC .............................................. 307/52, 85, 151
See application file for complete search history.

(56) References Cited

OTHER PUBLICATIONS

Barker, C., R., et al; "A Current Flow Controller for Use in HVDC Grids"; IEEE 10th IET Intern. Conference on AC and DC Power Transmission (ACDC), Seiten 1 bis 5, 2012).
Hofmann, V., et al; "A modular and scalable HVDC Current Flow Controller"; Proc. IEEE EPE. 2015.
Hassan, F., et al.; "Double modulation control (DMC) for dual full bridge current flow controller (2FB-CFC)"; Proc. IEEE EPE, 2015.

* cited by examiner

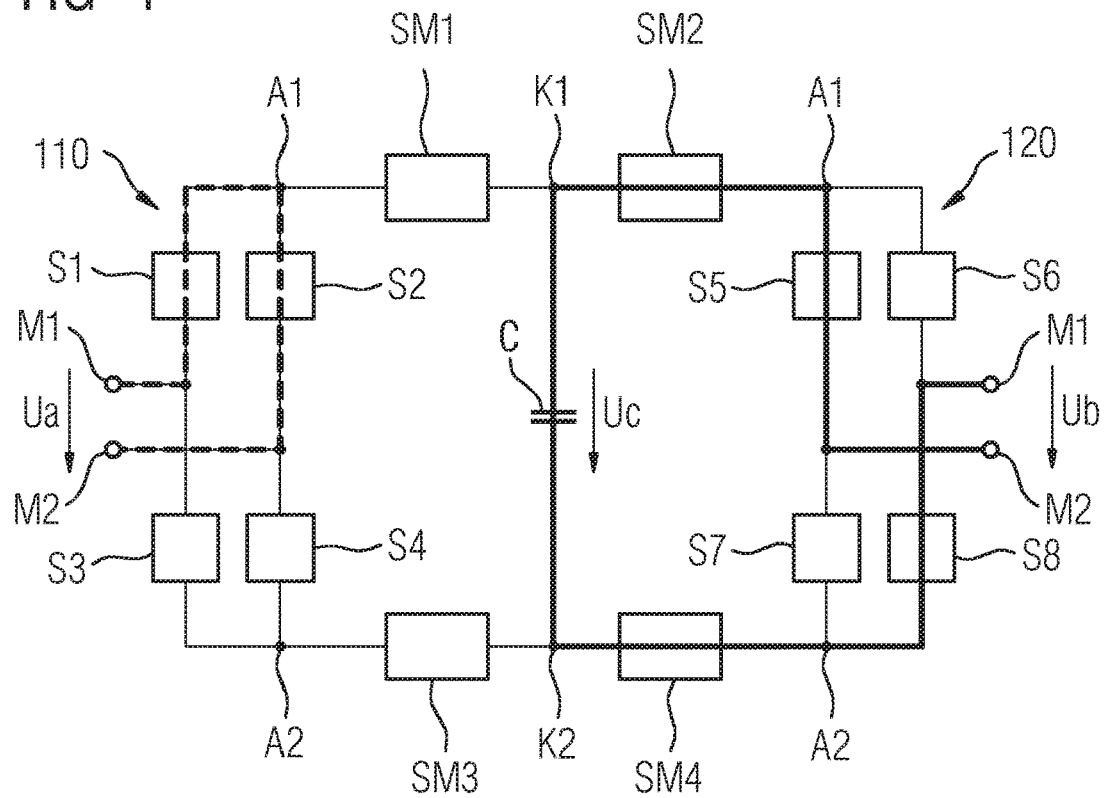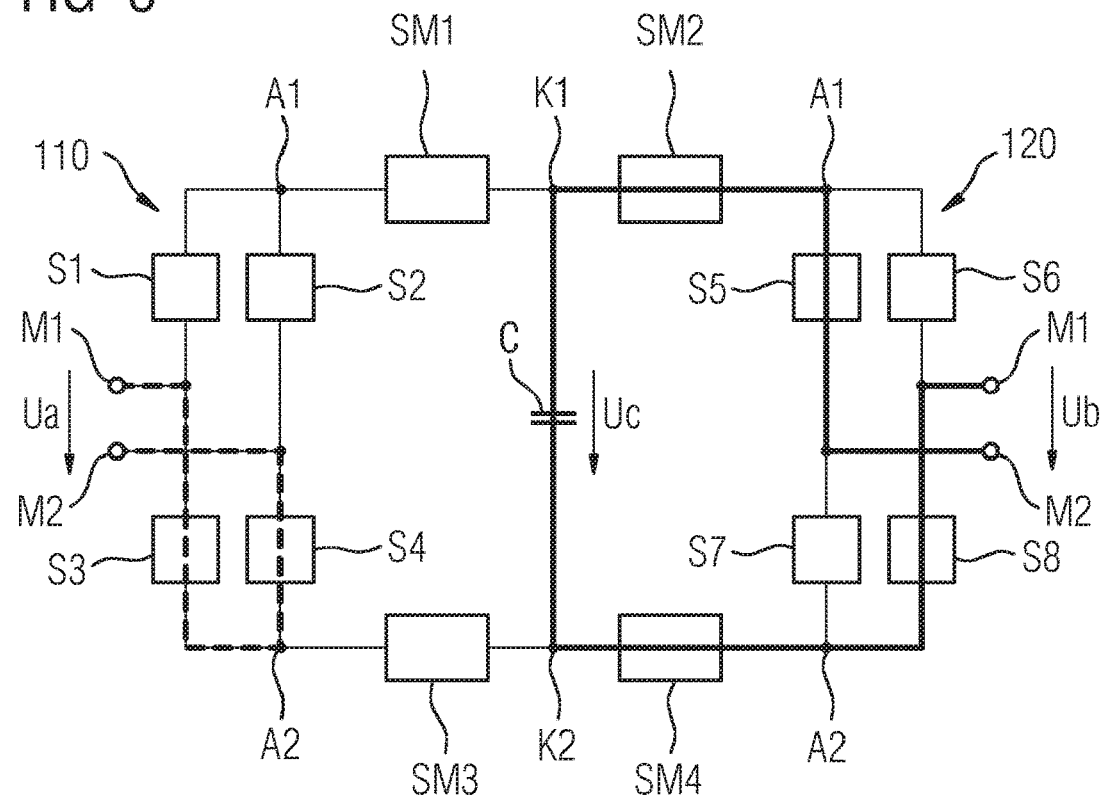

LONGITUDINAL VOLTAGE SOURCE AND DIRECT CURRENT TRANSMISSION SYSTEM WITH A LONGITUDINAL VOLTAGE SOURCE

BACKGROUND OF THE INVENTION

Field of the Invention

The invention relates to a switchable longitudinal voltage source for interconnection into a first line and a second line and for feeding in a respective longitudinal voltage into each of the two lines, wherein the longitudinal voltage source comprises: a first H-bridge circuit comprising four switches, said first H-bridge circuit having a first outer output terminal, a second outer output terminal and two center terminals, wherein the center terminals can be connected to the first line at a disconnected location of said first line, a second H-bridge circuit comprising four switches, said second H-bridge circuit having a first outer output terminal, a second outer output terminal and two center terminals, wherein the center terminals can be connected to the second line at a disconnected location of said second line, and a capacitor, the first capacitor terminal of which is connected to the two first output terminals of the two H-bridge circuits and the second capacitor terminal of which is connected to the two second output terminals of the two H-bridge circuits.

A longitudinal voltage source of this kind is described in the document "A current flow controller for use in HVDC grids" (C. Barker, R. Whitehouse, 10$^{th}$ IET Intern. Conference on AC and DC Power Transmission (ACDC), pages 1 to 5, 2012). The longitudinal voltage source can be switched into electrical lines of a direct current transmission system in order to couple said lines to one another and to make a flow of power between the lines possible.

The invention is based on the object of specifying a longitudinal voltage source that can be used in a particularly universal manner.

SUMMARY OF THE INVENTION

Said object is achieved according to the invention by way of a longitudinal voltage source having the features as claimed. Advantageous configurations of the longitudinal voltage source according to the invention are specified in the dependent claims.

Accordingly, the invention provides for at least one first switching module to be connected between the first capacitor terminal and the first output terminal of the first H-bridge circuit, at least one second switching module to be connected between the first capacitor terminal and the first output terminal of the second H-bridge circuit, at least one third switching module to be connected between the second capacitor terminal and the second output terminal of the first H-bridge circuit and at least one fourth switching module to be connected between the second capacitor terminal and the second output terminal of the second H-bridge circuit.

A major advantage of the longitudinal voltage source according to the invention can be seen in the fact that complete electrical isolation of the H-bridge circuits from one another can be achieved on account of the four switching modules provided according to the invention, as a result of which the possibility for cascading or series connection of longitudinal voltage sources is advantageously achieved and the construction of longitudinal voltage source cascades is made possible.

Another major advantage of the longitudinal voltage source according to the invention can be seen in the fact that the number of components is relatively low despite the possibility for cascading and the longitudinal voltage source according to the invention is therefore comparatively cost-effective.

The invention also relates to a direct current transmission system, in which at least one longitudinal voltage source according to the invention is provided. With respect to the advantages of the direct current transmission system according to the invention, reference is made to the above statements in connection with the longitudinal voltage source according to the invention.

With respect to the configuration of the direct current transmission system, it is considered advantageous when said direct current transmission system has a section comprising at least two direct current lines connected in parallel, the longitudinal voltage source is switched into the first of the two direct current lines by way of the two center terminals of the first H-bridge circuit and can switch the capacitor into the first direct current line, and the longitudinal voltage source is switched into the second of the two direct current lines by way of the two center terminals of the second H-bridge circuit and can switch the capacitor into the second direct current line.

The longitudinal voltage source preferably makes at least two switching states possible, namely a first switching state, in which the current flowing through the first direct current line flows through the first H-bridge circuit, the switched-on first switching module, the capacitor and the switched-on third switching module and in which the current flowing through the second direct current line alone flows through the second H-bridge circuit and is isolated from the capacitor and the first H-bridge circuit by the switched-off second and/or fourth switching module, and a second switching state, in which the current flowing through the second direct current line flows through the second H-bridge circuit, the switched-on second switching module, the capacitor and the switched-on fourth switching module and in which the current flowing through the first direct current line alone flows through the first H-bridge circuit and is isolated from the capacitor and the first H-bridge circuit by the switched-off first and/or third switching module.

It is particularly advantageous when the longitudinal voltage source also makes two further switching states possible, namely a third switching state, which corresponds to the first switching state with the difference that the current flow direction of the current through the capacitor is opposite to the current flow direction in the first switching state, and a fourth switching state, which corresponds to the second switching state with the difference that the current flow direction of the current through the capacitor is opposite to the current flow direction in the second switching state.

In view of the provision of different voltage levels, it is considered advantageous when the direct current transmission system has a longitudinal voltage source cascade, which has at least two longitudinal voltage sources as described above.

With respect to the interconnection of the longitudinal voltage sources within the longitudinal voltage source cascade, it is considered advantageous when the at least two longitudinal voltage sources form a first H-bridge series circuit in the first direct current line by way of their first H-bridge circuits and a second H-bridge series circuit in the second direct current line by way of their second H-bridge circuits.

If the longitudinal voltage source cascade is switched into two direct current lines connected in parallel, it is advantageous when the two direct current lines connected in parallel are connected directly to a first node by way of one of their conductor ends and are connected directly to a second node by way of their respective other conductor end and the longitudinal voltage source cascade is connected to the two direct current lines in the region of the first node, at least in a tighter manner at the first node than at the second node.

In view of the voltages arising within the longitudinal voltage source cascade, it is considered advantageous when the dielectric strength of the switching modules of the longitudinal voltage sources of the longitudinal voltage source cascade increases in each case by the cutoff voltage of the capacitor of the longitudinal voltage sources in the direction from the first node to the second node—from longitudinal voltage source to longitudinal voltage source.

The switching modules of the longitudinal voltage sources of the longitudinal voltage source cascade are preferably of identical design.

Particularly in the case of the last-mentioned configuration, in view of the voltages to be switched, it is advantageous when, in the longitudinal voltage sources of the longitudinal voltage source cascade, the number of first, second, third and fourth switching modules increases in each case by one switching module—as seen in the direction from the first node to the second node and from longitudinal voltage source to longitudinal voltage source.

The switching modules of the longitudinal voltage sources are preferably capable of switching and blocking in bidirectional fashion.

It is particularly advantageous when the switching modules of the longitudinal voltage sources of the longitudinal voltage source cascade are each formed by two transistor modules that are interconnected in series in inverse fashion or with opposing polarity, in particular insulated-gate bipolar transistors having antiparallel diodes.

The invention also relates to a longitudinal voltage source cascade comprising at least two longitudinal voltage sources, as have been described above.

The at least two longitudinal voltage sources preferably form, by way of the center terminals of the first H-bridge circuits, a first H-bridge series circuit that can be switched into the first line and, by way of the center terminals of the second H-bridge circuits, a second H-bridge series circuit that can be switched into the second line.

The dielectric strength of the switching modules of the longitudinal voltage sources of the longitudinal voltage source cascade preferably increases in each case by the cutoff voltage of the capacitor of the longitudinal voltage sources in the longitudinal direction of the cascade—from longitudinal voltage source to longitudinal voltage source.

BRIEF DESCRIPTION OF THE SEVERAL VIEWS OF THE DRAWING

The invention is explained in more detail below with reference to exemplary embodiments; here, by way of example:

FIGS. 2-9 show switching states of the longitudinal voltage source according to FIG. 1 in more detail.

In the figures, the same reference signs are always used for identical or comparable components for the sake of clarity.

DESCRIPTION OF THE INVENTION

Figure 1:
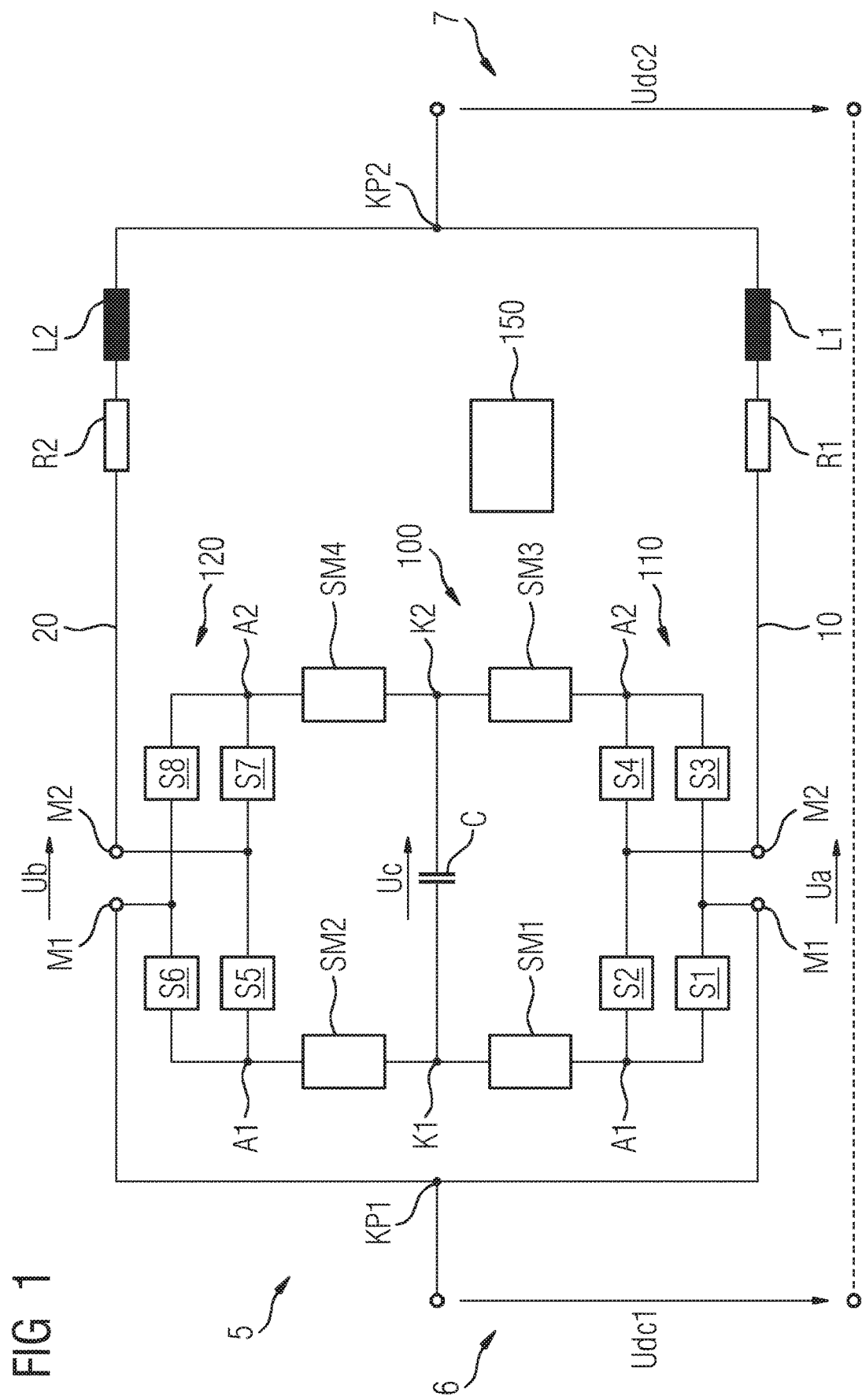
FIG. 1 shows an exemplary embodiment of a direct current transmission system according to the invention, which is provided with an exemplary embodiment of a switchable longitudinal voltage source according to the invention.
Figure 2:
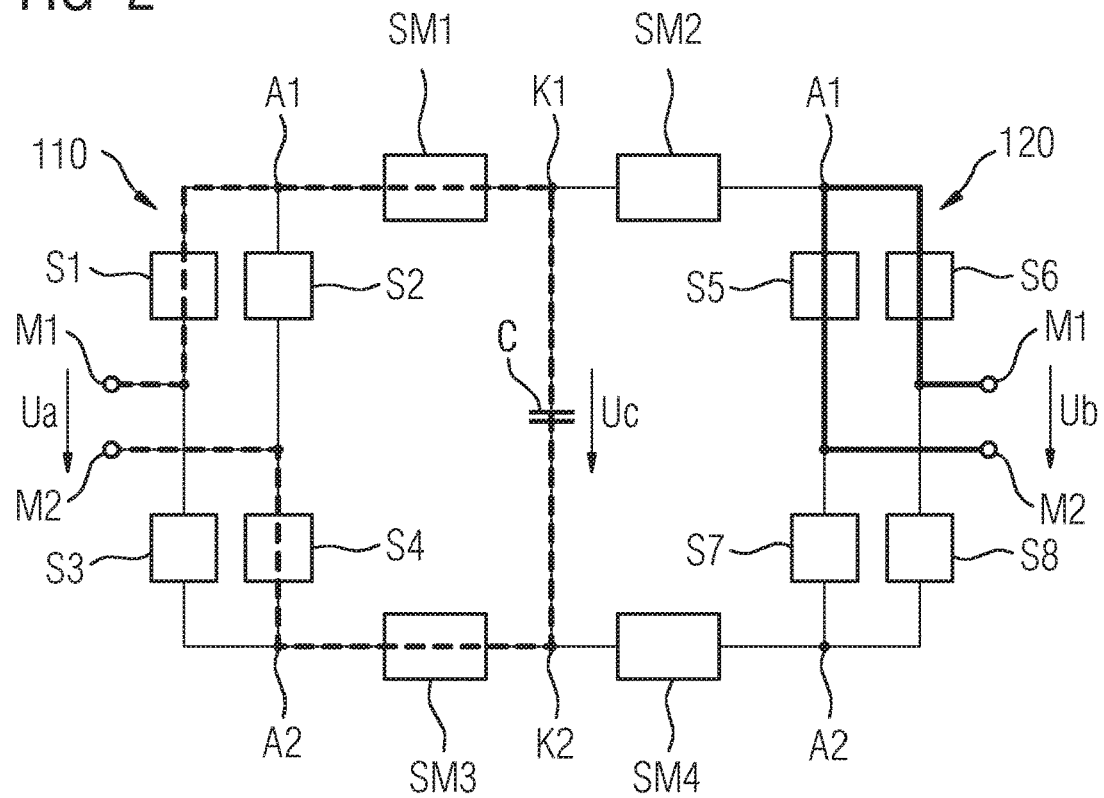
Figure 3:
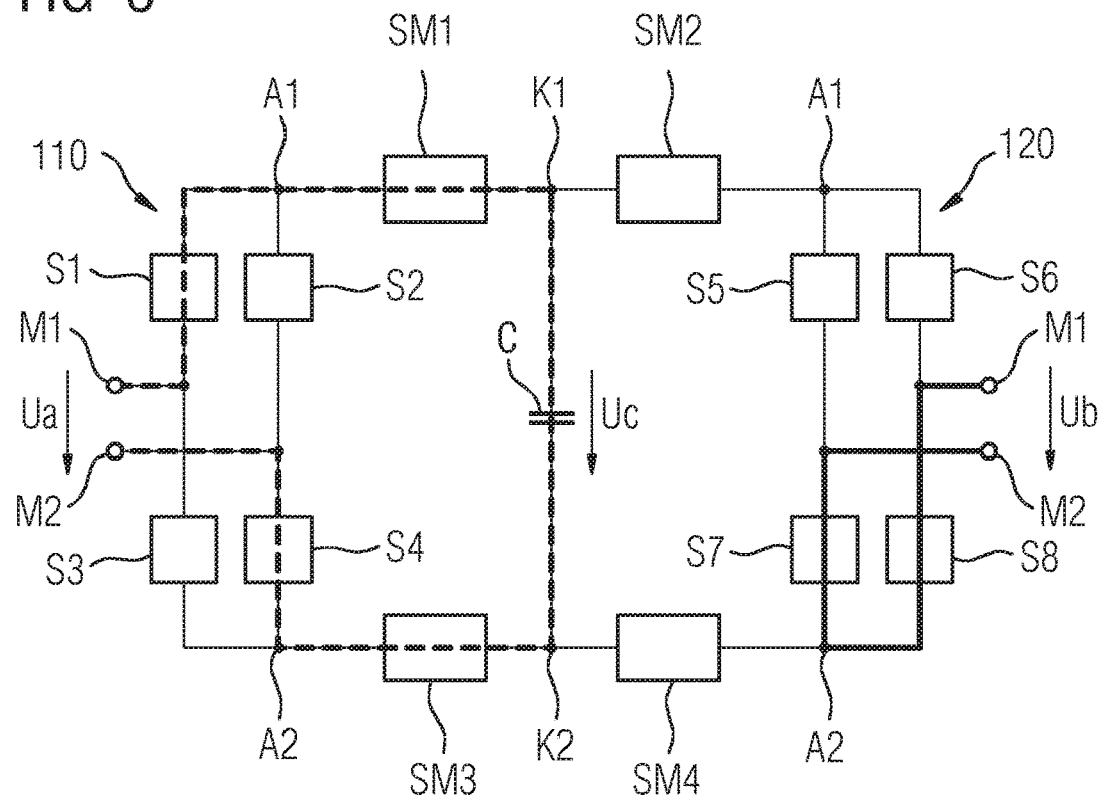
Figure 6:
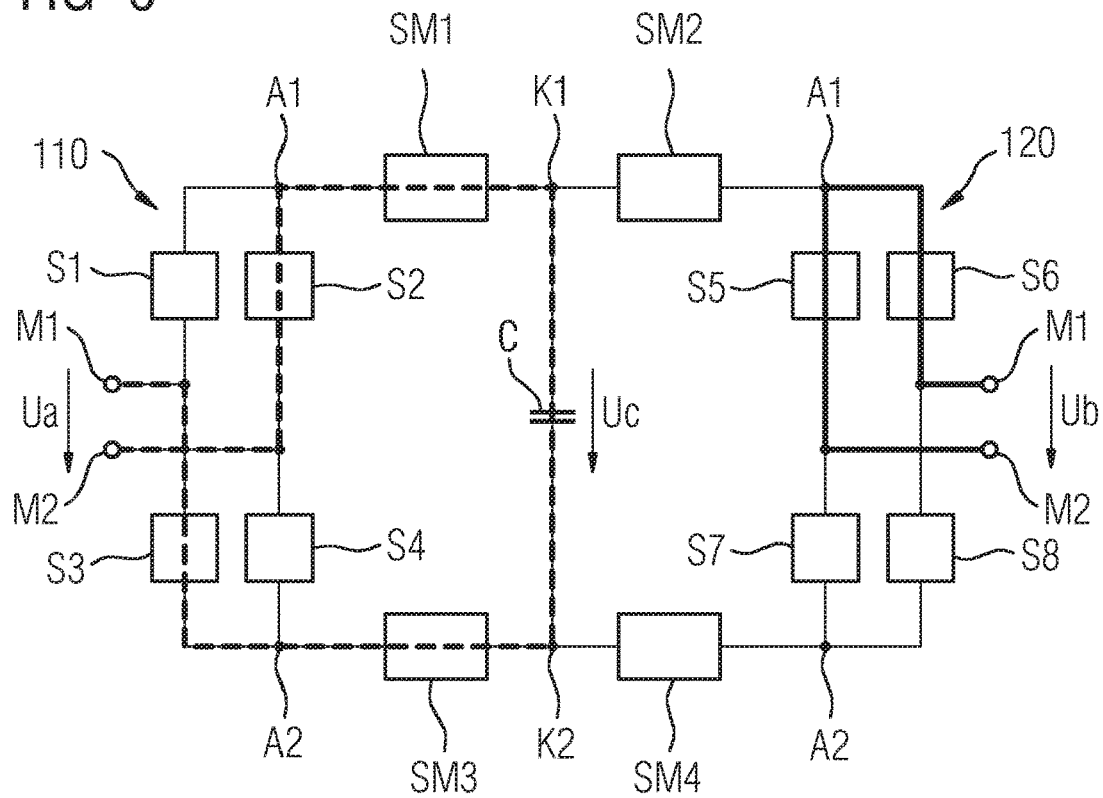
Figure 7:
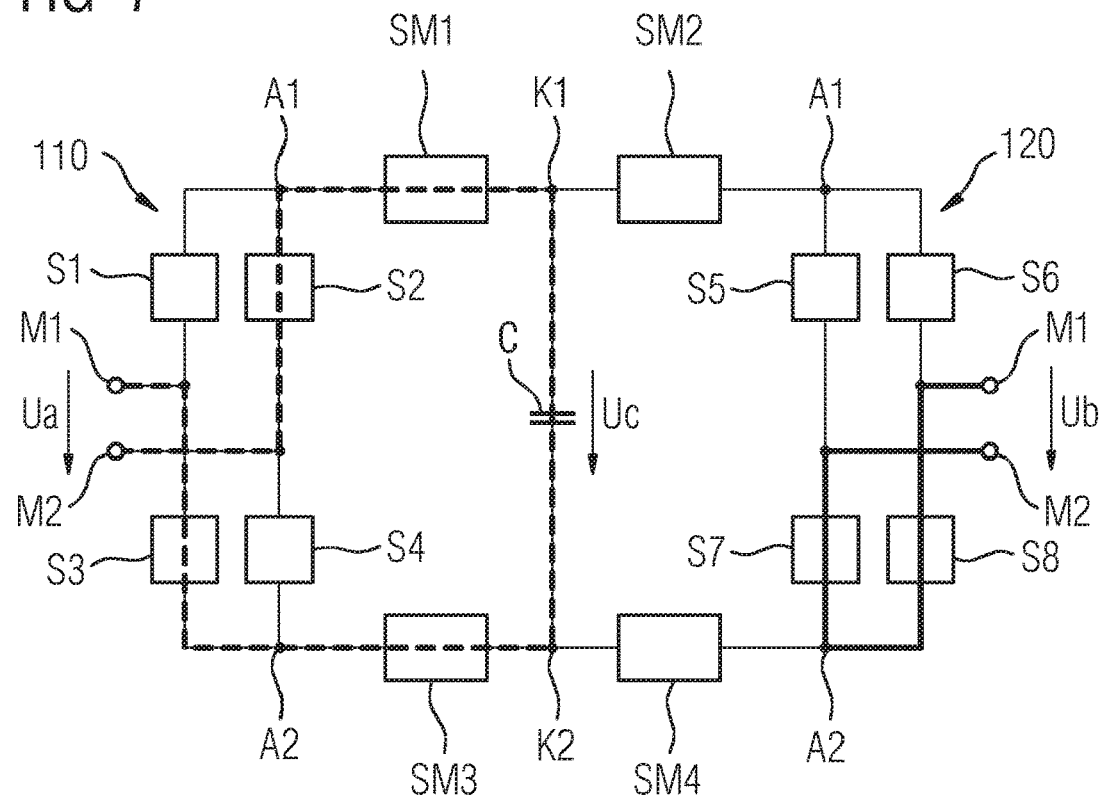
Figure 8:
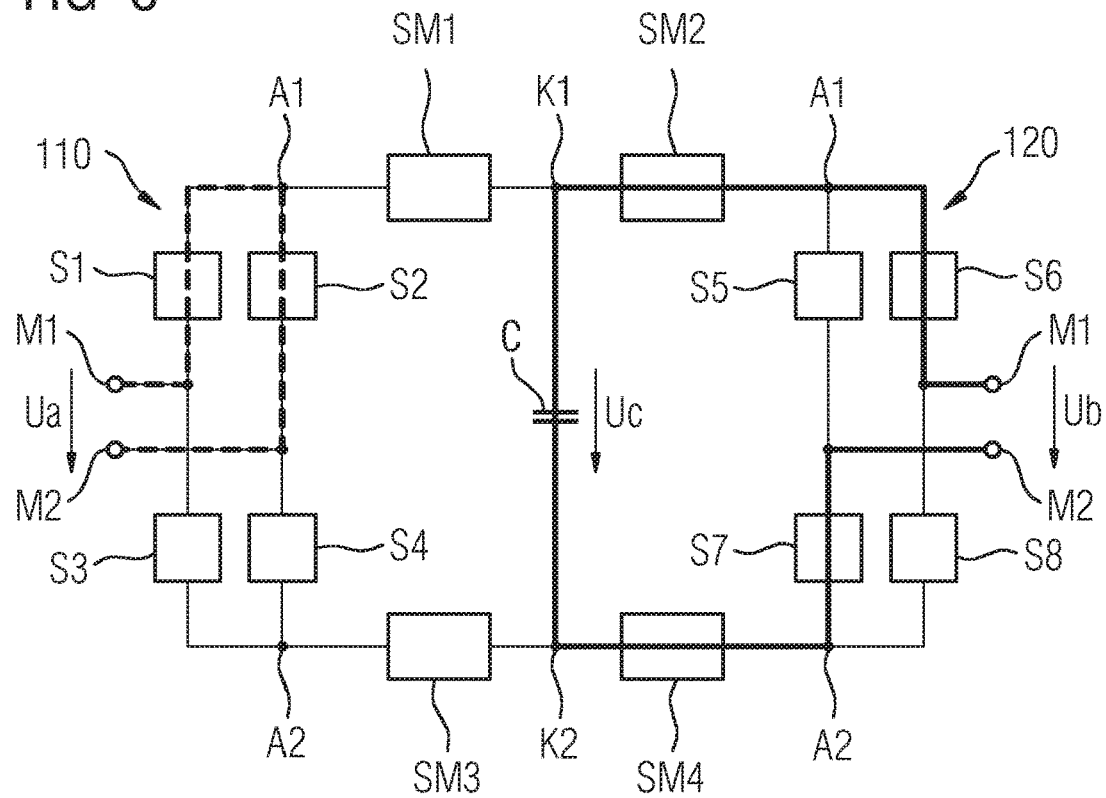
Figure 9:
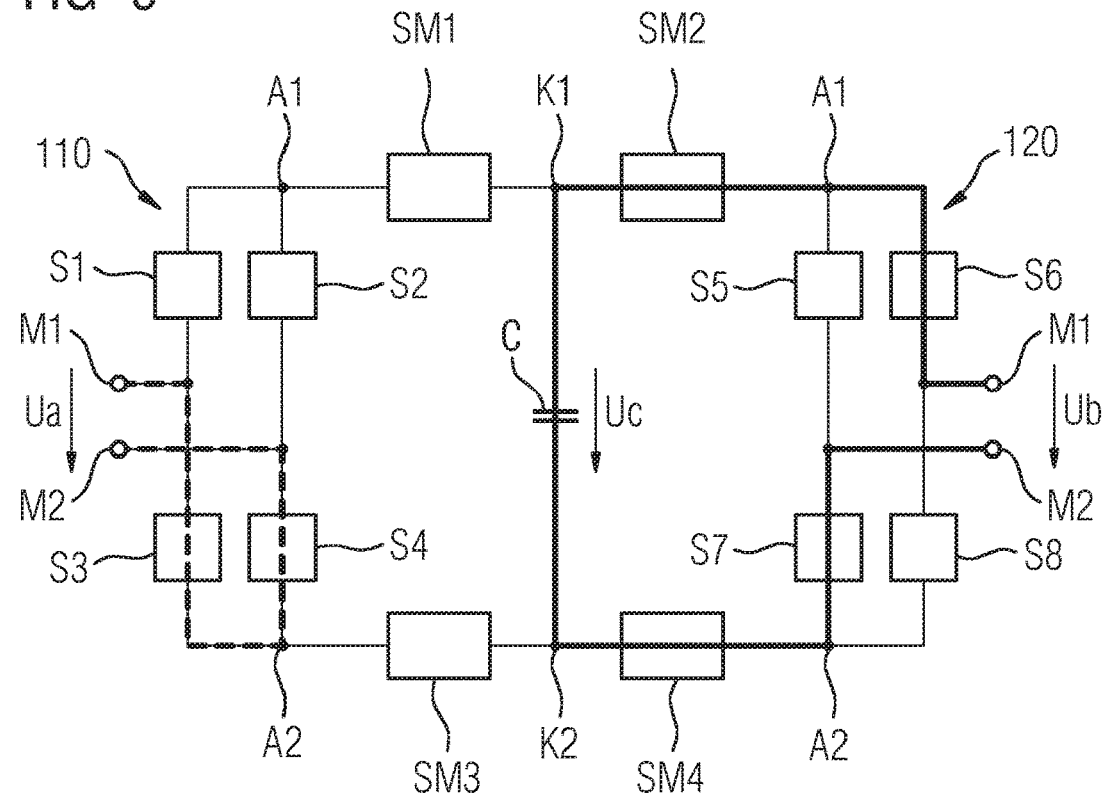

FIG. 1 shows a direct current transmission system 5, which couples a DC voltage system 6, which is shown on the left of FIG. 1 and carries a DC voltage Udc1, to a DC voltage system 7, which is shown on the right of FIG. 1 and carries a DC voltage Udc2.

The direct current transmission system 5 comprises a first direct current line 10 and a second direct current line 20. The two direct current lines 10 and 20 are connected in parallel and are electrically connected directly to one another at a first node KP1 and a second node KP2.

The first direct current line 10 has an ohmic resistor R1 and an inductance L1 and the second direct current line 20 has an ohmic resistor R2 and an inductance L2.

A switchable longitudinal voltage source 100 is switched into the two direct current lines 10 and 20, said switchable longitudinal voltage source being able to switch a voltage Ua into the first direct current line 10 and a voltage Ub into the second direct current line 20.

The longitudinal voltage source 100 has a first H-bridge circuit 110, which comprises four switches S1, S2, S3 and S4, a first outer output terminal A1, a second outer output terminal A2 and two center terminals M1 and M2.

The two center terminals M1 and M2 are switched into the first direct current line 10 at a disconnected location of said direct current line 10 and form connection terminals of the longitudinal voltage source 100 for said line, across which connection terminals the voltage Ua is dropped.

The longitudinal voltage source 100 also has a second H-bridge circuit 120, which comprises two center terminals M1 and M2, a first outer output terminal A1, a second outer output terminal A2 and four switches S5, S6, S7 and S8. The second H-bridge circuit 120 and hence the longitudinal voltage source 100 as a whole is switched into the second direct current line 20 by way of the two center terminals M1 and M2. The two center terminals M1 and M2 of the second H-bridge circuit 120 form connection terminals of the longitudinal voltage source 100, across which a voltage Ub fed into the second direct current line 20 is dropped.

The longitudinal voltage source 100 also has a capacitor C, across which a capacitor voltage Uc is dropped.

A first capacitor terminal K1 of the capacitor C is connected to the first outer output terminal A1 of the first H-bridge circuit 110 by means of a first switching module SM1 and to the first outer output terminal A1 of the second H-bridge circuit 120 by means of a second switching module SM2.

The second capacitor terminal K2 of the capacitor C is connected to the second outer output terminal A2 of the first H-bridge circuit 110 by means of a third switching module SM3 and to the second outer output terminal A2 of the second H-bridge circuit 120 by means of a fourth switching module SM4.

Depending on the switching state of the eight switches S1 to S8 and the four switching modules SM1 to SM4, the capacitor voltage Uc of the capacitor C can be switched selectively between the two center terminals M1 and M2 of the first H-bridge circuit 110 and hence into the first direct current line 10 or alternatively can be switched between the two center terminals M1 and M2 of the second H-bridge circuit 120 and hence into the second direct current line 20. The eight switches S1 to S8 and the four switching modules SM1 to SM4 are actuated by a control device 150, which is connected to the switches and switching modules by means of connecting lines, which are not shown in FIG. 1 for the sake of clarity.

The voltages Ua and Ub, which are fed into the first electrical direct current line 10 and into the second direct current line 20, are listed in the following table depending on the switching states of the switches S1 to S8 and the switching modules SM1 to SM4; the last column of the table specifies the figure that shows the respective switching state:

| S1 | S2 | S3 | S4 | S5 | S6 | S7 | S8 | SM1 | SM2 | SM3 | SM4 | Ua | Ub | FIG. |
|----|----|----|----|----|----|----|----|-----|-----|-----|-----|----|----|------|
| 1 | 0 | 0 | 1 | 1 | 1 | 1 | 0 | 1 | 0 | 1 | 0 | Uc | 0 | 2 |
| 1 | 0 | 0 | 1 | 0 | 0 | 1 | 1 | 1 | 0 | 1 | 0 | Uc | 0 | 3 |
| 1 | 1 | 0 | 0 | 1 | 0 | 0 | 1 | 0 | 1 | 0 | 1 | 0 | −Uc | 4 |
| 0 | 0 | 1 | 1 | 1 | 0 | 0 | 1 | 0 | 1 | 0 | 1 | 0 | −Uc | 5 |
| 0 | 1 | 1 | 0 | 1 | 1 | 0 | 0 | 1 | 0 | 1 | 0 | −Uc | 0 | 6 |
| 0 | 1 | 1 | 0 | 0 | 0 | 1 | 1 | 1 | 0 | 1 | 0 | −Uc | 0 | 7 |
| 1 | 1 | 0 | 0 | 0 | 1 | 1 | 0 | 0 | 1 | 0 | 1 | 0 | Uc | 8 |
| 0 | 0 | 1 | 1 | 0 | 1 | 1 | 0 | 0 | 1 | 0 | 1 | 0 | Uc | 9 |

In FIGS. 2 to 9, the current paths through the longitudinal voltage source 100 are marked depending on the switching states.

The longitudinal voltage source 100 according to FIG. 1 can be used to implement load flow control between the two direct current lines 10 and 20 by virtue of DC power being coupled out of one of the two direct current lines and into the respectively other direct current line. The power exchange between the two direct current lines 10 and 20 is implemented by means of the capacitor C of the longitudinal voltage source 100. For the purpose of load flow control, the voltage coupled into the two direct current lines 10 and 20 is preferably modulated in a temporal manner by virtue of switching back and forth respectively between the states +Uc/0 and 0/−Uc.

Figure 10:
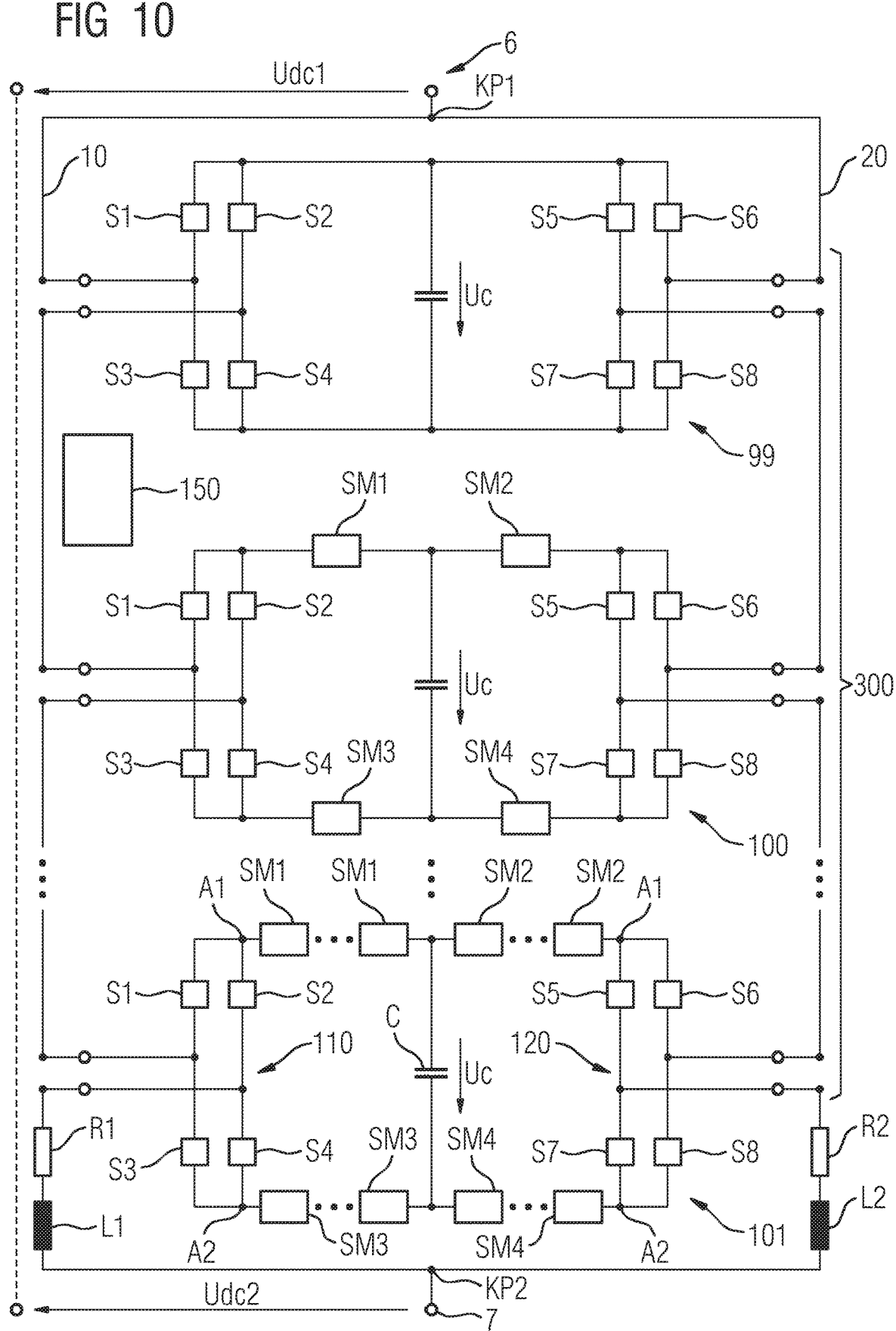
FIG. 10 shows an exemplary embodiment of a direct current transmission system according to the invention, which is provided with a longitudinal voltage source cascade.

FIG. 10 shows an exemplary embodiment of a direct current transmission system 5, which couples a DC voltage system 6, which is shown at the top of FIG. 10 and carries a DC voltage Udc1, to a DC voltage system 7, which is shown at the bottom of FIG. 10 and carries a DC voltage Udc2.

The direct current transmission system 5 comprises a first direct current line 10 and a second direct current line 20. The two direct current lines 10 and 20 are connected in parallel and are electrically connected directly to one another at a first node KP1 and a second node KP2.

A longitudinal voltage source cascade 300 of the direct current transmission system 5 is switched into the two direct current lines 10 and 20 in the region of a first node KP1 and makes it possible to feed voltages into the two direct current lines.

The longitudinal voltage source cascade 300 comprises a multiplicity of longitudinal voltage sources, of which only three are illustrated in FIG. 10 for the sake of clarity and are denoted with the reference signs 99, 100 and 101. The longitudinal voltage source 100 is identical to the longitudinal voltage source 100 from FIG. 1.

The first longitudinal voltage source 99 of the longitudinal voltage source cascade 300 does not have any switching modules SM1 to SM4—in contrast to the other longitudinal voltage sources.

In the longitudinal voltage sources 100 and 101 of the longitudinal voltage source cascade 300, the number of switching modules SM1 to SM4, which are connected between the outer terminals A1 and A2, respectively, of the two H-bridge circuits 110 and 120 and the capacitor C, increases in each case by one switching module—as seen in the direction from the first node KP1 to the second node KP2, that is to say from longitudinal voltage source to longitudinal voltage source—in order to satisfy the demands on the dielectric strength that increase in the direction of the second node KP2.

The switching modules are preferably of identical design and are each formed in such a way that they can each support the cutoff voltage of the capacitor C of the longitudinal voltage sources.

The capacitors C of the longitudinal voltage sources and the eight switches S1 to S8 of the longitudinal voltage sources are preferably likewise of identical design or identical.

The switches and switching modules of the longitudinal voltage source cascade 300 are actuated by a control device 150, which is connected to the switches and switching modules by means of connecting lines, which are not shown in the figure for the sake of clarity.

Figure 11:
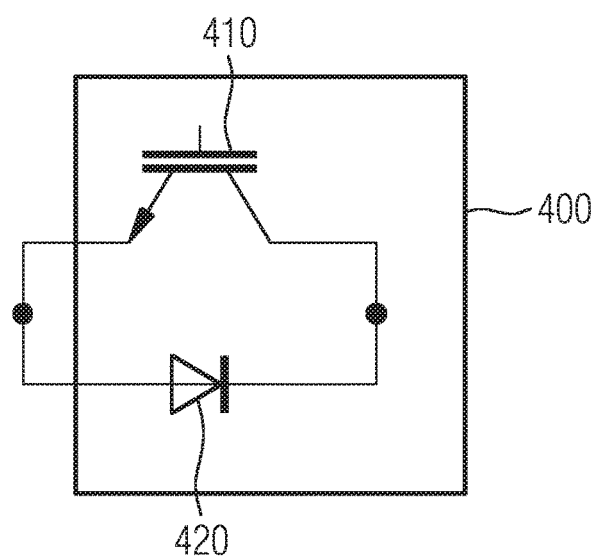
FIG. 11 shows an exemplary embodiment of a switch, which can be used in the H-bridge circuits of the longitudinal voltage source according to FIG. 1.

FIG. 11 shows an exemplary embodiment of a switch 400, which can be used in the H-bridge circuits 110 and 120 as one of the switches S1 to S8. The switch 400 comprises a bipolar transistor 410, preferably an insulated-gate bipolar transistor (that is to say an IGBT), and a diode 420 connected in antiparallel therewith.

Figure 12:
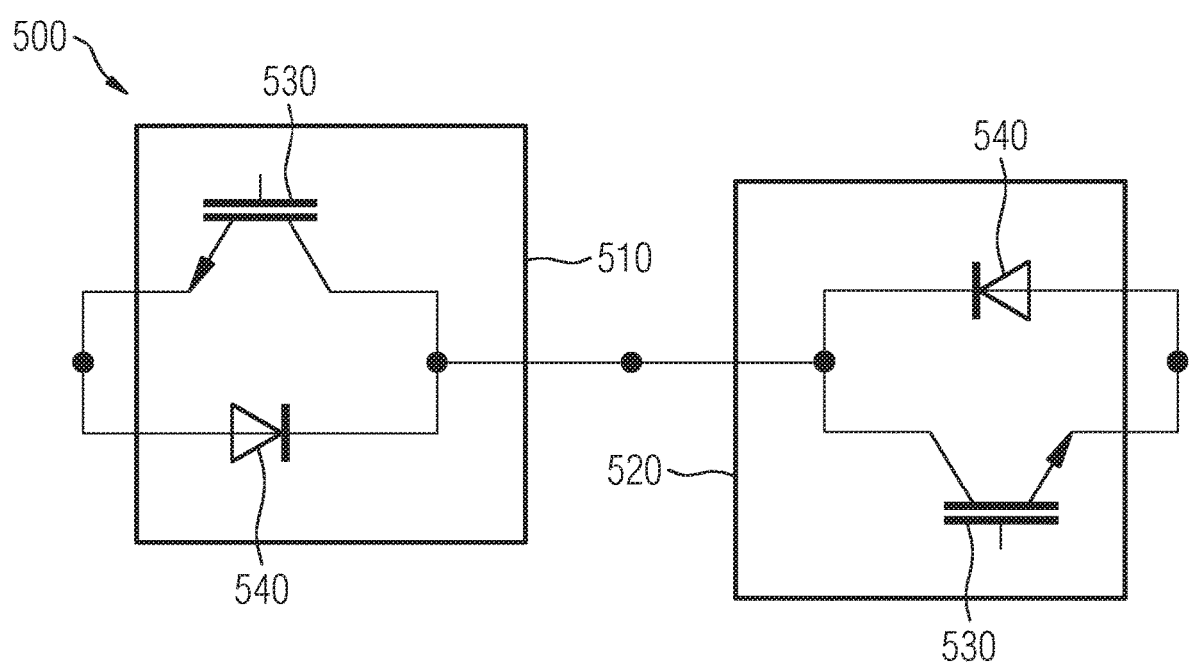
FIG. 12 shows an exemplary embodiment of a switching module, which can be used for electrical connection and isolation of the H-bridge circuits of the longitudinal voltage source according to FIG. 1.

FIG. 12 shows an exemplary embodiment of a switching module 500, which can be used as one of the switching modules SM1 to SM4 of the longitudinal voltage source 100 according to FIG. 1 or the longitudinal voltage sources 100 and 101 of the longitudinal voltage source cascade 300 according to FIG. 10. The switching module 500 comprises two transistor modules 510 and 520 that are interconnected in series in inverse fashion or with opposing polarity, said transistor modules preferably being in each case a bipolar transistor 530, preferably an insulated-gate bipolar transistor (that is to say an IGBT), and a diode 540 connected in antiparallel therewith. The configuration and interconnection of the transistor modules 510 and 520 shown in FIG. 12 advantageously ensures that the switching module 500 is capable of switching and blocking in bidirectional fashion.

Although the invention has been illustrated and described in more detail by way of preferred exemplary embodiments, the invention is not restricted by the disclosed examples and other variations can be derived herefrom by a person skilled in the art without departing from the scope of protection of the invention.

LIST OF REFERENCE SIGNS

5 Direct current transmission system
6 DC voltage system
7 DC voltage system
10 First direct current line
20 Second direct current line
99 Longitudinal voltage source
100 Longitudinal voltage source
101 Longitudinal voltage source
110 First H-bridge circuit
120 Second H-bridge circuit
150 Control device
300 Longitudinal voltage source cascade
400 Switch
410 Bipolar transistor
420 Diode
500 Switching module
510 Transistor module
520 Transistor module
530 Bipolar transistor
540 Diode
A1 First outer output terminal
A2 Second outer output terminal
C Capacitor
K1 First capacitor terminal
K2 Second capacitor terminal
KP1 First node
KP2 Second node
L1, L2 Inductance
M1 Center terminal
M2 Center terminal
R1, R2 Ohmic resistor
S1-S8 Switch
SM1 First switching module
SM2 Second switching module
SM3 Third switching module
SM4 Fourth switching module
Ua Voltage
Ub Voltage
Uc Capacitor voltage
Udc1 DC voltage
Udc2 DC voltage

The invention claimed is:

1. A switchable longitudinal voltage source for interconnection into a first line and a second line and for feeding in a respective longitudinal voltage into each of the first and second lines, the longitudinal voltage source comprising:
   a first H-bridge circuit with four switches, said first H-bridge circuit having a first outer output terminal, a second outer output terminal and two center terminals, wherein said center terminals are connectable to the first line at a disconnected location of the first line;
   a second H-bridge circuit with four switches, said second H-bridge circuit having a first outer output terminal, a second outer output terminal and two center terminals, wherein said center terminals are connectable to the second line at a disconnected location of the second line;
   a capacitor having a first capacitor terminal connected to said first outer output terminals of said first and second H-bridge circuits and a second capacitor terminal connected to said second outer output terminals of said first and second H-bridge circuits;
   at least one first switching module connected between said first capacitor terminal and said first outer output terminal of said first H-bridge circuit;
   at least one second switching module connected between said first capacitor terminal and said first outer output terminal of said second H-bridge circuit;
   at least one third switching module connected between said second capacitor terminal and said second outer output terminal of said first H-bridge circuit; and
   at least one fourth switching module connected between said second capacitor terminal and said second outer output terminal of said second H-bridge circuit.

2. A direct current transmission system, comprising at least one longitudinal voltage source according to claim 1.

3. The direct current transmission system according to claim 2, wherein:
   a section of the direct current transmission system has at least two direct current lines, including a first direct current line and a second direct current line, connected in parallel;
   the longitudinal voltage source is switched into the first direct current line by way of the two center terminals of the first H-bridge circuit and is configured to switch a capacitor into the first direct current line; and
   the longitudinal voltage source is switched into the second direct current line by way of the two center terminals of the second H-bridge circuit and is configured to connect the capacitor into the second direct current line.

4. The direct current transmission system according to claim 2, wherein said longitudinal voltage source is configured to enable at least two switching states, the at least two switching states including:
   a first switching state, in which the current flowing through the first direct current line flows through said first H-bridge circuit, the switched-on first switching module, the capacitor and the switched-on third switching module and in which the current flowing through the second direct current line alone flows through said second H-bridge circuit and is isolated from the capacitor and said first H-bridge circuit by the switched-off second and/or fourth switching module; and
   a second switching state, in which the current flowing through the second direct current line flows through said second H-bridge circuit, the switched-on second switching module, the capacitor and the switched-on fourth switching module and in which the current flowing through the first direct current line alone flows through said first H-bridge circuit and is isolated from the capacitor and the first H-bridge circuit by the switched-off first and/or third switching module.

5. The direct current transmission system according to claim 4, wherein said longitudinal voltage source is configured to enable two further switching states, the two further switching states including:
   a third switching state the corresponds to the first switching state, except that a current flow direction of a current through the capacitor is opposite to the current flow direction in the first switching state; and
   a fourth switching state that corresponds to the second switching state, except that a current flow direction of the current through the capacitor is opposite to the current flow direction in the second switching state.

6. The direct current transmission system according to claim 2, comprising a longitudinal voltage source cascade formed with at least two said longitudinal voltage sources according to claim 1, said at least two longitudinal voltage sources forming a first H-bridge series circuit in the first direct current line by way of the first H-bridge circuits thereof and a second H-bridge series circuit in the second direct current line by way of the second H-bridge circuits thereof.

7. The direct current transmission system according to claim 6, wherein:
the first and second, parallel-connected direct current lines are connected directly to a first node by way of one of their conductor ends and are connected directly to a second node by way of their respectively other conductor end; and
said longitudinal voltage source cascade is connected to the first and second direct current lines in a region of said first node more closely at said first node than at said second node.

8. The direct current transmission system according to claim 6, wherein a dielectric strength of said switching modules of said longitudinal voltage sources of said longitudinal voltage source cascade increases in a direction from said first node to said second node, from one said longitudinal voltage source to a next said longitudinal voltage source, in each case by a cutoff voltage of said capacitor of said longitudinal voltage sources.

9. The direct current transmission system according to claim 6, wherein, in said longitudinal voltage sources of said longitudinal voltage source cascade, a number of first, second, third and fourth switching modules increases in each case by one said switching module, in a direction from said first node to said second node and from one said longitudinal voltage source to another said longitudinal voltage source.

10. The direct current transmission system according to claim 6, wherein said switching modules of said longitudinal voltage sources of said longitudinal voltage source cascade are identical in design.

11. The direct current transmission system according to claim 6, wherein each of said switching modules of said longitudinal voltage sources of said longitudinal voltage source cascade is formed by two transistor modules that are interconnected in series and with opposing polarity.

12. The direct current transmission system according to claim 11, wherein said transistor modules are formed with insulated-gate bipolar transistors and an antiparallel diode.

13. The direct current transmission system according to claim 2, wherein said switching modules of said longitudinal voltage sources are semiconductor switching modules that are capable of bidirectional switching and blocking.

14. A longitudinal voltage source cascade, comprising at least two longitudinal voltage sources according to claim 1 connected to form a cascade.

15. The longitudinal voltage source cascade according to claim 14, wherein said at least two longitudinal voltage sources form, by way of said center terminals of said first H-bridge circuits, a first H-bridge series circuit to be switched into the first line and, by way of said center terminals of said second H-bridge circuits, a second H-bridge series circuit to be switched into the second line.

16. The longitudinal voltage source cascade according to claim 14, wherein a dielectric strength of said switching modules of said longitudinal voltage sources increases in each case by a cutoff voltage of said capacitor in a longitudinal direction of the cascade, from one longitudinal voltage source to a next longitudinal voltage source.

* * * * *